Nov. 23, 1965  L. DEMAS  3,219,139
VEHICLE RUNNING GEAR
Filed April 27, 1962
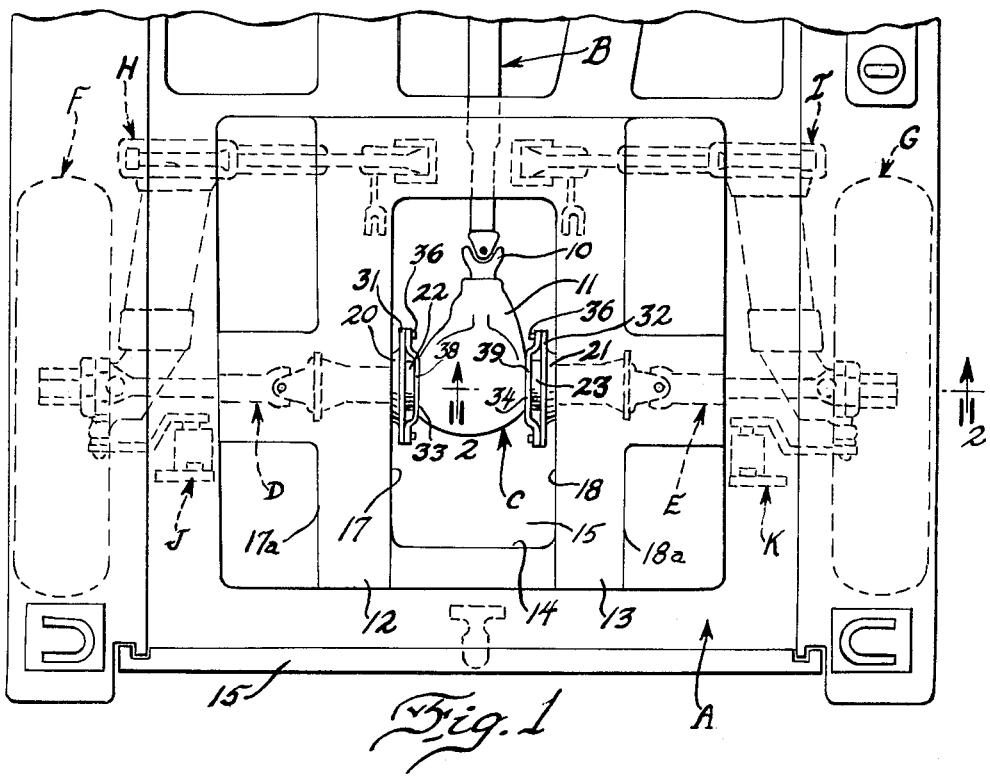
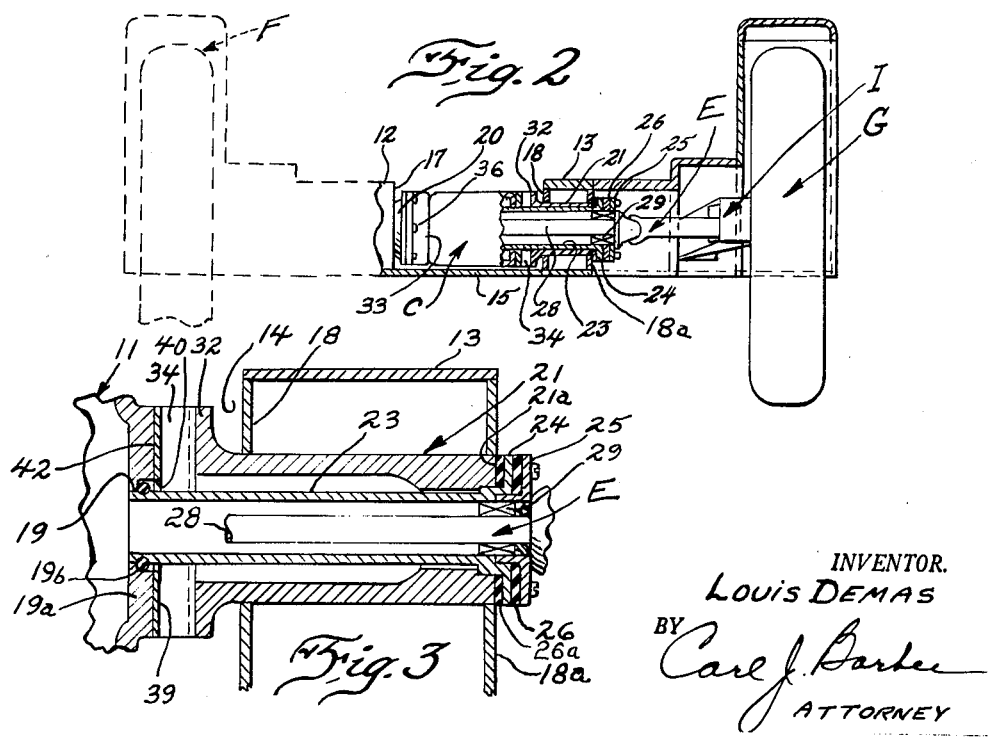
INVENTOR.
LOUIS DEMAS
BY
Carl J. Barber
ATTORNEY

United States Patent Office 3,219,139
Patented Nov. 23, 1965

3,219,139
VEHICLE RUNNING GEAR
Louis Demas, Oak Park, Mich., assignor to American Motors Corporation, Kenosha, Wis., a corporation of Maryland
Filed Apr. 27, 1962, Ser. No. 190,648
2 Claims. (Cl. 180—88)

The invention relates to the running gear of an automotive vehicle and has particular reference to the driving mechanism extending from the principal drive shaft to the auxiliary transversely directed wheel driving shafts.

An object of the invention is to provide in the running gear of a vehicle a differential mechanism, the housing of which is directly anchored with reference to the vehicle body.

A specific object of the invention involves the construction of the body beams for accommodating the differential mechanism therebetween.

A further specific object is to provide means for mounting the differential housing with reference to spaced longitudinal beams of the automobile body.

Other objects and advantages of the invention will be apparent from the ensuing specification and appended drawing in which:

FIGURE 1 is a plan view of one end of a vehicle employing the inventive subject matter.

FIGURE 2 is a sectional view taken generally on the line 2—2 of FIGURE 1.

FIGURE 3 is a detail plan view of a portion of the mechanism shown in FIGURE 2.

In general, I have shown an automotive vehicle in which the body A may be of modular type construction. The principal drive shaft B extends from the engine (not shown) to the differential assembly C. The auxiliary wheel driving or axle shafts D and E transmit drive to the wheels F and G.

The vehicle body is suspended with reference to the wheels by means of the suspension arm assemblies H and I and shock absorbing assemblies J and K.

The principal drive shaft extends longitudinally of the vehicle at approximately the center line thereof and leads to a universal joint 10 and thence into the interior of the differential housing 11. Conventional differential gearing (not shown) is contained in the differential housing and transmits drive to each of the wheels through the axle shafts D and E.

The vehicle body includes longitudinally extending beams 12 and 13 of box section construction which may extend throughout the length of the vehicle. A pocket 14 is formed between the beams and has a floor 15 which forms part of the hull of the vehicle. Exteriorly of each beam the opposite side walls of the vehicle body are provided with suitable pockets to accommodate the wheels F and G. The inner side walls 17 and 18 of the beams provide the supports to which the differential housing is anchored with reference to the vehicle body. Tubular inserts 20 and 21 project through the respective beams 12 and 13 and are securely anchored to the opposite side walls 17–17a and 18–18a as by means of welding. Tubular sleeves 22 and 23 project through the respective inserts and the inner ends of same project into bores 19 formed in the end walls 19a of the differential housing at the opposite sides thereof. A flexible O-ring 19b encircles the sleeves 22 and 23 abutting against the annular shoulder formed in the differential housing end walls 19a for preventing entry of foreign materials into the interior of the differential housing 11. The sleeves are provided with radially outwardly extending flanges 24 at their outer ends. A suitable circular collar 25 is bolted to the outer face of the flange 24 with a gasket 26 preventing entry of foreign material or water into the interior of the sleeve 23, as when the vehicle is being used amphibiously. The axle shaft 28 is supported within the sleeve 23 by means of a suitable bearing 29. A gasket 26a may be inserted between the end face 21a of insert 21 and the inner face of flange 24 to prevent entry of water or foreign material into the interior of insert 21.

The tubular inserts are provided with radially outwardly extending flanges 31 and 32 to which the mounting brackets 33 and 34 are securely bolted, as by means of bolts 36. The mounting brackets have offset central portions 38 and 39 which are anchored to the differential housing at the opposite side faces 42 thereof. The brackets are, of course, provided with central openings 40 through which the tubular sleeves 23 project.

Thus, it can be seen that the differential housing is securely anchored within the pocket area 14 to the vehicle body, namely, the beams 12 and 13. The construction is such that water is prevented from gaining access to the interior of the support sleeves 20 and 21 and 22 and 23.

I claim:
1. In a vehicle, a body having a floor panel and longitudinally extending hollow beams rigid therewith, said beams being spaced apart to provide in conjunction with the floor panel a pocket above the floor; an engine situated toward one end of the vehicle; said body having wheel accommodating pockets in each side wall; a wheel within each pocket and suspending the body relative thereto; a differential housing mounted in the pocket between the beams; a tubular insert projecting through each beam and being anchored thereto, each tubular insert having one end opening into a wheel pocket and the other end opening into the pocket; brackets anchored on each side of the differential housing, the inner ends of the tubular inserts being anchored one to each bracket; said housing having a tubular sleeve on either side thereof and projecting through the respective tubular inserts; each tubular sleeve having a radially extending flange at its end; a resilient washer being interposed between each radially extending flange and the end of a respective tubular insert; fastening means for securing each radially extending flange to the end of the respective tubular insert; driven shafts drivingly connected to each wheel and projecting through the respective tubular sleeves into the interior of the differential housing; a drive shaft extending from the engine to the differential housing for establishing driving engagement with the driven shafts.

2. Apparatus as set forth in claim 1 wherein the differential housing has a bore on either side thereof and the tubular sleeves on either side of the housing project, one into each bore, and a flexible O-ring encircles each tubular sleeve adjacent each housing bore.

References Cited by the Examiner
UNITED STATES PATENTS

| | | | |
|---|---|---|---|
| 1,515,815 | 11/1924 | Roche | 180—73 X |
| 1,678,180 | 7/1928 | Cook | 115—1 |
| 2,025,669 | 12/1935 | Lundelius et al. | 180—73 |
| 2,071,577 | 2/1937 | Renwick et al. | 180—73 X |
| 2,382,836 | 8/1945 | Walter | 180—73 X |
| 2,719,044 | 9/1952 | Walter | 115—1 |

FOREIGN PATENTS
826,767  1/1960  Great Britain.

A. HARRY LEVY, *Primary Examiner.*